United States Patent
Heider

(10) Patent No.: US 7,128,064 B2
(45) Date of Patent: Oct. 31, 2006

(54) METHOD AND APPARATUS TO PROVIDE OXYGEN ENRICHED AIR TO THE INTAKE MANIFOLD OF AN INTERNAL COMBUSTION ENGINE

(76) Inventor: James E. Heider, 811 W. Wooster, Bowling Green, OH (US) 43402

( * ) Notice: Subject to any disclaimer, the term of this patent is extended or adjusted under 35 U.S.C. 154(b) by 0 days.

(21) Appl. No.: 11/044,428

(22) Filed: Jan. 26, 2005

(65) Prior Publication Data

US 2005/0199231 A1    Sep. 15, 2005

Related U.S. Application Data

(60) Provisional application No. 60/546,417, filed on Feb. 20, 2004.

(51) Int. Cl.
    *F02B 23/00* (2006.01)
(52) U.S. Cl. ..................... 123/585; 123/586
(58) Field of Classification Search ............ 123/585, 123/586, 699, 700
    See application file for complete search history.

(56) References Cited

U.S. PATENT DOCUMENTS

| | | | |
|---|---|---|---|
| 3,709,203 A | | 1/1973 | Cettin et al. |
| 3,792,690 A | | 2/1974 | Cooper |
| 3,817,232 A | | 6/1974 | Nakajima et al. |
| 3,977,365 A | | 8/1976 | Vierling et al. |
| 4,064,840 A | * | 12/1977 | Vierling ............ 123/3 |
| 4,927,434 A | | 5/1990 | Cordes et al. |
| 4,960,098 A | | 10/1990 | Akerib |
| 5,517,978 A | * | 5/1996 | Yi ............... 123/585 |
| 5,553,591 A | * | 9/1996 | Yi ............... 123/585 |
| 6,352,068 B1 | | 3/2002 | Jacobsen |
| 6,722,352 B1 | * | 4/2004 | Smolarek et al. ........ 123/585 |
| 2003/0010382 A1 | | 1/2003 | Meckes et al. |
| 2004/0055585 A1 | * | 3/2004 | Smolarek et al. ........ 123/585 |

FOREIGN PATENT DOCUMENTS

| | | | |
|---|---|---|---|
| JP | 03145546 A | | 6/1991 |
| JP | 05141229 A | | 6/1993 |

OTHER PUBLICATIONS

Aklyoshi Sakoda and Motoyuki Suzuki; Performance and Potential of Pistion-Driven Rapid Cycle Pressure Swing Adsorption; pp. 332-336.
AirSep Corporation; PSA Oxygen Generator; Onyx; Instruction Manual; ORO2/03; Feb. 2003.
International Search Report; PCT/US05/02587; Apr. 14, 2005.
Written Opinion Of The International Preliminary Examining Authority.

* cited by examiner

*Primary Examiner*—Noah P. Kamen
*Assistant Examiner*—Jason Benton
(74) *Attorney, Agent, or Firm*—Emch, Schaffer, Schaub & Porcello Co., L.P.A.

(57) ABSTRACT

This invention describes a method which can be used to improve the output torque and resulting horsepower of internal combustion engines while lowering the overall pollution experienced with these engines. This invention will allow smaller displacement engines to be used in transportation vehicles without sacrifice of driveability. In some applications existing high horsepower engines can be boosted to even higher output levels. This invention describes an on board system that separates nitrogen ($N_2$) from air leaving an oxygen ($O_2$) enriched air that is used in combination with fuel to improve operation of the engine during its various modes of operation (start-up, acceleration, cruise, deceleration and idle).

18 Claims, 4 Drawing Sheets

METHOD AND APPARATUS TO PROVIDE OXYGEN ENRICHED AIR TO THE INTAKE MANIFOLD OF AN INTERNAL COMBUSTION ENGINE

CROSS REFERENCE TO RELATED APPLICATION

The present application is based upon and claims the benefit of U.S. Provisional application No. 60/546,417 filed Feb. 20, 2004.

BACKGROUND OF THE INVENTION

The purpose of this invention is to provide oxygen enriched air to an internal combustion engine (IC). The automobile industry in the United States has had to cater to the consumer by supplying vehicles that provide driveability. Driveability is defined as autos with motors with sufficient torque and horsepower to allow good acceleration when needed to start from a dead stop or to quickly enter traffic on the highway. In general, consumers outside the United States have, mostly due to the higher cost of fuel, been willing to accept lighter weight vehicles with poor acceleration performance. Thus, the average United States automobile has an engine with higher horsepower rating, along with the higher displacement needed to satisfy the consumers demand. These engines are usually less efficient and provide a higher volume of tailpipe gasses due to the higher displacement of these engines. It is well know that nitrous oxide can be injected into the intake manifold of an engine along with additional fuel to provide a tremendous power surge for automobiles. The nitrous oxide which is approximately 36% oxygen by weight to 64% nitrogen provides the additional oxygen needed to combust the additional fuel. This reaction increases the torque and power of the engine by a significant amount (typically 75–200 horse power or more). The use of nitrous oxide for this purpose puts a tremendous strain on the engine, thereby reducing its life. Because of such strain, typically the nitrous oxide fuel mixture is used for only about 10 seconds at a time as longer periods of use could damage the engine.

The present invention, in some modes of operation or demands on the engine, does not require the use of additional fuel but rather provides more oxygen to assure that the normally supplied amount of fuel is more efficiently used to gain additional value (horse power) from that fuel. Under the present invention, there is a reduction in the amount of unburned hydrocarbons and nitrogen compounds supplied to the exhaust pipe. The present invention not only increases the amount of oxygen in the combustion reaction, it also reduces the amount of nitrogen in this reaction, thereby providing efficiency of operation while reducing pollutants. Any excess oxygen in the combustion reaction will burn some of the hydrocarbons in the exhaust system. The present invention may be used with gasoline, propane, natural gas, diesel, and hydrogen fueled internal combustion engines. If additional fuel is also supplied to the engine while using oxygen enriched air, additional power can be achieved. The additional fuel would be less than that supplied in the case where nitrous oxide is used as that level of power improvement cannot be maintained for extended periods of time. The present invention can supply an increase in power output which is sustainable over long periods of time and, under controlled conditions, for the life of the vehicle.

It is also well known that a process known as Pressure Swing Absorption (PSA) can be used to increase the level of oxygen and reduce the level of nitrogen in an air stream. The prior art process utilizes a molecular sieve, that absorbs nitrogen from air when the air is placed in contact with it under pressure. When air is passed through the molecular sieve contained in a bed or container at above atmospheric pressure, most of the nitrogen is absorbed into the bed with the result that the air stream flowing from the bed has a higher percent of oxygen than normal air. When the molecular sieve in such bed has reached its saturation point of absorbing nitrogen, the air at above atmospheric pressure is directed to a second molecular sieve bed to continue the absorbing process. The first bed is then exposed to atmospheric pressure, with the result that the nitrogen in that bed is desorbed. The higher than atmospheric pressure air flow is alternated between the two beds resulting in a continuous flow of oxygen enriched air. The foregoing type of system has not been used in internal combustion engines so far as the applicant can determine.

The object of the present invention is to introduce small increases in oxygen enrichment to the fuel propelling an internal combustion engine. Large quantities of air are introduced to an internal combustion engine during operation. For example, a 200 cu inch displacement engine running at 2000 RPM at a speed of 60 miles/hr requires approximately 120 cu ft. of air/minute. The 120 cu. ft. of air contains approximately 24 cu. ft. of oxygen. To boost the power at that operative point by 10%, 2½ cu. ft. of oxygen enriched air would be needed to be added to the 120 cu. ft. of combustion air along with an appropriate amount of fuel. In that mode of operation, the power boost could be used to pass traffic.

The apparatus of the present invention has the capability of providing oxygen enriched air in those quantities without damaging the engine.

Under one embodiment, the present invention provides an on-board oxygen generation system which, under appropriate system control, results in the desired engine improvement. The oxygen enriched air is stored in a container and is selectively released into the manifold along with additional fuel. The oxygen enriched air produced and delivered to the engine intake manifold reduces overall emission while boasting torque resulting in higher horsepower to the drive train.

Under another embodiment of the present invention, oxygen enriched air may be fed directly from the molecular sieve $O_2$ enrichment chamber to the combustion chamber.

The automobile industry has recognized that smaller, higher output engines are desirable and have developed and provided to the market systems (Superchargers, Turbochargers) which do allow smaller motors to develop higher torque and horsepower. A supercharger is a belt driven compressor which supplies pressurized air to the engine intake manifold. A turbocharger uses a turbine located in the exhaust system to power a turbine in the intake system which pressurizes the intake manifold. Both systems pressurize the combustion air supplied to the engine cylinders. The designs of these systems are based on the fact that additional power output requires additional air and fuel to be supplied to the combustion chamber. This result is achieved by pressurizing the air in the intake manifold and injecting more fuel. The net result of pressurizing the intake manifold is that additional oxygen is forced into the combustion chamber when the intake valve is opened. Along with the additional oxygen that enters the combustion chamber, the approximate 80% of the air which is made up of nitrogen is also pressurized into the combustion chamber. This high level of nitrogen in effect goes along for the ride and exits the tailpipe. As a result of boosting the output of the engine using such systems, the volume of gases exiting the tailpipe to atmosphere increases over that resulting from the displacement of the same normally aspirated engine. The present invention in its preferred form does not increase pressure to the intake manifold. As a result, the volume of the tailpipe gasses is directly related to the displacement of the engine, and is not increased by any pressurizing of air to the manifold.

However, the present invention does not rule out the use of a supercharger or turbocharger. In those cases when it is desired to gain the maximum horsepower output from an engine, the oxygen enriched air could be supplied as a portion of the air being pressurized by the supercharger or turbocharger. This would result in additional oxygen in the air to fuel ratio in the combustion chamber and would develop additional horsepower output on supercharged or turbocharged engines. This invention also describes a system where all the combustion air is treated in a supercharged or turbocharged engine to boost power.

The objective of using a smaller motor in automobiles, while still providing driveability, has also been approached by the auto industry in the hybrid gas/electrical design. In this system a smaller horsepower engine (gas or diesel) is used to charge a set of batteries. The vehicle is then driven by electrical motors with the energy being supplied by the batteries. One hybrid system uses a gasoline engine which has a horsepower rating greater than is needed to maintain cruising speed but not large enough to provide good acceleration. The energy stored in the batteries provides the desired acceleration and the lower energy demand during cruising. This hybrid system is presently being offered to the consumer.

For the hybrid system to be fully acceptable and find widespread use in the industry a good deal of new technology must be production hardened. New reliable drive systems, improved battery life and lower costs are some of the many challenges that need to be overcome.

This invention, in effect, follows a similar strategy. That is during cruising, the low energy demand is provided by the internal combustion engine while $O_2$ enriched air is manufactured and placed in a storage tank. That $O_2$ enriched air is later provided to the engine with additional fuel to boost torque and horsepower when demanded during acceleration. The difference is that with this invention, standard automotive drive components that have been developed to a high level of reliability are used. The potential energy in the form of $O_2$ enriched air is stored in a light weight low cost storage container. In contrast, the hybrid gas/electric system must haul around heavy, high cost batteries which are expensive to replace. It is projected by many in the industry that such hybrid system will take many years to become accepted and will require the industry to make huge capital investments in new production systems.

Drag racers have long recognized that the addition of oxygen to the combustion chamber results in very large increases in output torque and horsepower of the engine. However, prior to the present invention a practical system that could be used on board the vehicle to continuously separate nitrogen from oxygen was not available. Drag racers for years have used the nitrous oxide system (NOS) in a high pressure tank to supply oxygen to their engines to develop significant torque and horsepower increases. Improvements of from 1 to 3 full seconds and 10 to 15 mph in a quarter mile (0.25 mile) can be expected. Holley Inc. (www.HOLLEY.com) supplies systems which can be bolted on most production engines. For example this company supplies 50 state legal nitrous oxide systems for 4.0 L Mustang and 305/350 GM V8's. Although these systems are very effective in boosting engine torque and horsepower the system is not practical and cost effective for the average driver who wants driveability, good mileage and a low polluting vehicle. The system requires a high pressure cylinder of nitrous oxide to be hooked up to the engine. This high pressure cylinder must be changed after approximately three minutes of high output use.

The lesson from the nitrous oxide system (NOS) is that increases of oxygen levels in the combustion chamber can make tremendous engine output improvements and that, at the proper level of oxygen addition, stock engines can retain the reliability desired. The Holly website states that if maximum reliability from most stock engines is desired, a limit must be placed on the amount of boost that is achieved. The site states that "4 cylinder engines normally allow an extra 40–60 horsepower, 6 cylinder engines usually work great between 75–100 horsepower, smaller block V8's (302/350/400 cid) can typically accept up to an extra 140 horsepower and big block (427 to 454 cid) might accept from 125–200 extra horsepower." The term "cid" is cu. inch displacement.

When using the NOS system the nitrous oxide is injected into the intake manifold together with additional fuel. This nitrous oxide gas mixes with the normally aspirated air and fuel from the fuel injectors to provide the final mix in the combustion chamber. At about 572 degrees F., the nitrous oxide gas breaks down and releases oxygen (36 percent by weight) and nitrogen. This 36 percent oxygen mixes with the regular aspirated air containing 20 percent oxygen. As a result, the oxygen level supplied to the combustion chamber, is somewhere in between these two values. The full 36 percent level of oxygen would shorten the life of the engine. The correct level of oxygen boost to assure long engine life should be determined by testing.

Presently modern automobile engines are computer controlled by the Engine Control Unit (ECU). The ECU is supplied data from sensors which measure:

Oxygen in the exhaust system
Mass air flow
Throttle position
Coolant temperature
Voltage
Manifold absolute pressure
Engine speed This data together with the performance chips in the ECU is used to calculate the control actions needed under various operating conditions and send appropriate control signals. One of these control signals (pulse width) is sent to the fuel injection system to vary the amount of fuel provided at various driving conditions. The mass air flow, throttle position and rate of change of the throttle sensors could be used to control the addition of $O_2$ enriched air and additional fuel as contemplated by the present invention to optimize the power output of the engine. Thus optimizing of the engine in all modes of operation would be available.

During a cold start of the engine the pollution level at the exhaust pipe is high as the combustion reaction is taking place at low temperature. By using the present invention during this mode, the ECU would supply additional $O_2$ enriched air to the combustion chamber to raise the reaction temperature and speed the heat-up of the engine. This would reduce the pollution level during that period. During cruising if the oxygen level in the exhaust system drops to a low level additional oxygen would be introduced into the intake manifold (or exhaust manifold) to assure sufficient oxygen is available to complete combustion.

SUMMARY OF THE INVENTION

This invention provides for an internal combustion engine driven vehicle with an on-board system to manufacture and store $O_2$ enriched air. The $O_2$ enriched air is used to optimize the drive engine performance, improving fuel economy while reducing overall pollution levels. This invention is one answer to the national goals of reduction of total pollution and the reduction of dependence on foreign oil imports.

IN THE DRAWINGS

FIG. 1 is a schematic view of an apparatus for introducing enriched oxygen into the intake manifold of an internal combustion engine.

(Embodiment 1).

DETAILED DESCRIPTION OF INVENTION

Embodiment 1

Figure 1:
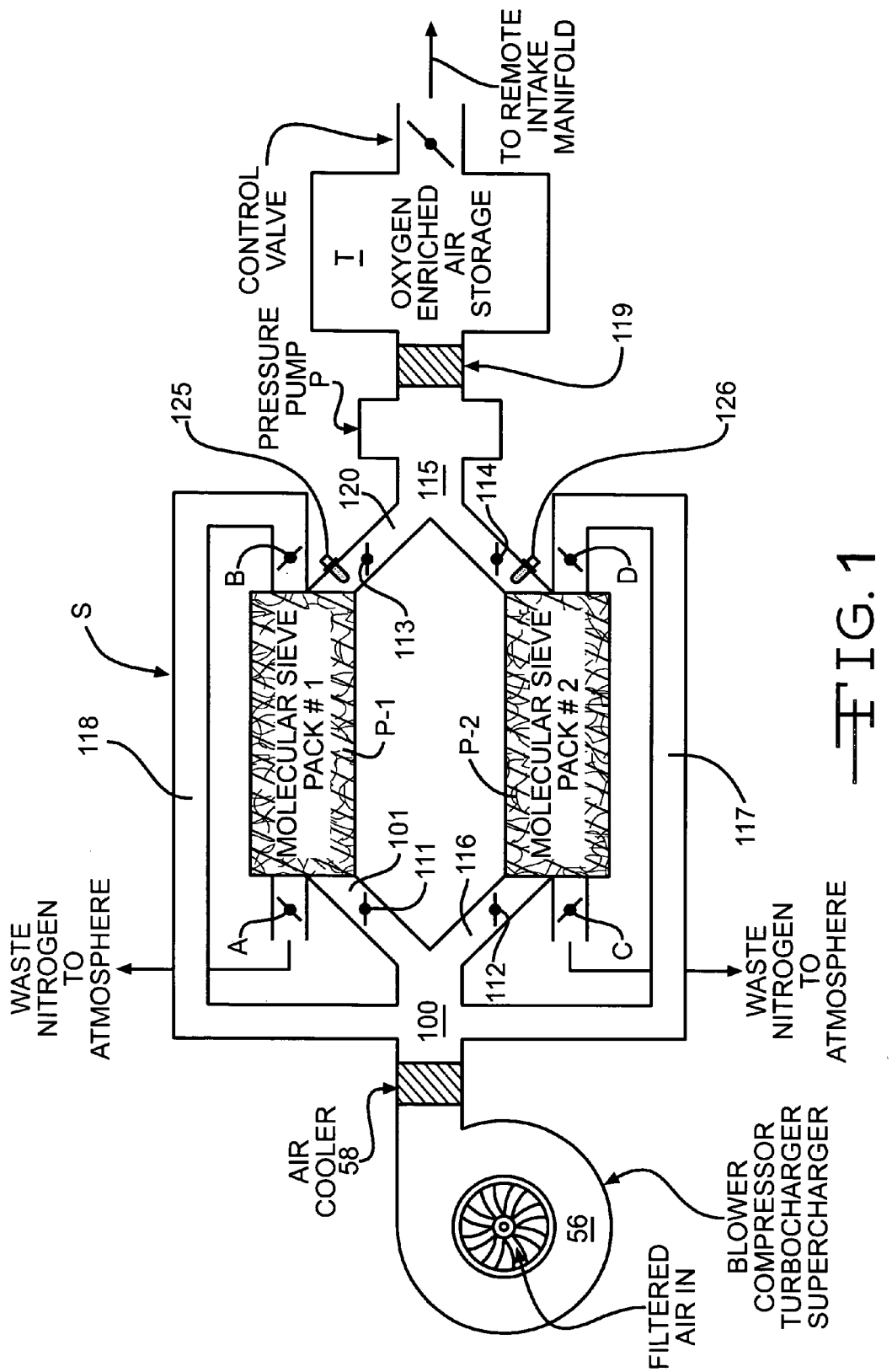

The schematic shown in FIG. 1 depicts the proposed system S to manufacture oxygen enriched air on-board a vehicle. This enriched air is then used to optimize the operation of the vehicle's internal combustion engine.

In this embodiment, filtered air enters the intake of a blower, compressor, turbocharger, or supercharger 56 where the pressure and flow rate is raised. The air flows through an air cooler 58 and then enters the manufacturing system at channel 100. The air flows through channel 101 and enters molecular sieve pack P-1 or through to channel 112 and enters molecular sieve pack P-2. One type of material which could be used for the molecular sieve packs P-1 and P-2 is a synthetic zeolite which absorbs a portion of he nitrogen from the air passing therethrough such that the air exiting therefrom is oxygen enriched. To direct the air to sieve pack P-1, valves 111 and 113 are placed in the open position and valves 112, 114, A and B are closed. The air flows through pack P-1 where the nitrogen is absorbed into the material contained in the molecular sieve (i.e. synthetic zeolite). The resulting oxygen enriched air flows out through channel 120 and channel 115 to a pressure pump P where the pressure is raised. Exiting from the pump P, the oxygen enriched air is cooled by an air cooler 119 and flows into a storage tank T.

While the first molecular sieve pack P-1 is absorbing nitrogen, some of the supply air at low pressure flows from channel 100 to and through channel 117, through open valve D and then through the second molecular sieve pack P-2 and out to atmosphere through open valve C. This flow of air at low pressure flushes the desorbed nitrogen from the second molecular pack P-2 making it ready to produce oxygen enriched air on its next cycle when valves 112 and 114 are open to permit air under pressure to flow through channels 100 and 116 to and through molecular sieve pack P-2. During the flow through channel 112, valves 111, 113, C and D are closed and valves A and B are open. The nitrogen from the air is absorbed in the second pack P-2 and the oxygen enriched air from the second pack P-2 flows through channels 114 and 115 into the pressure pump P. The oxygen enriched air exits pressure pump P flowing through the cooler 119 and is stored at pressure in the storage tank T.

When needed, the oxygen enriched air is released to the intake manifold of the vehicle's internal combustion engine. While the air is flowing through the second pack P-2, air is directed through channel 118, through open valves B and A to back flush the desorbed nitrogen from the first pack P-1 to ready it for the next cycle.

A first oxygen sensor 125 is positioned in the channel 113 near the first molecular sieve pack P-1 and a second oxygen sensor 126 is positioned in the channel 114 near the second molecular sieve pack P-2. The oxygen sensors 125 and 126 signal the control system when nitrogen absorption by the molecular sieve is substantially complete and switch over from air under pressure flowing through the first pack P-1 to air under pressure flowing through the second pack P-2. A suitable sensor for sensors 125 and 126 is one manufactured by Maxtec Inc., 6526 South Catlinwood Street, Salt Lake City, Utah 84107 under its model No. MAX™ 250 R125P01-002 oxygen sensor.

The process described and shown in FIG. 1 may be referred to as the PSA (pressure swing absorption) process for manufacturing oxygen enriched air. The PSA process can be enhanced by applying a vacuum to the packs P-1 and P-2 when they are in the desorption mode. Vacuum can be applied near the valve A and valve C respectively during the desorption cycle of their respective packs P-1 or P-2. When vacuum is used, the process may be referred to as the VPSA process (vacuum pressure swing absorption).

Embodiment 2

Embodiment 2 discloses a new novel and rapid way to enrich the air with oxygen and then either store it for later use as in Embodiment 1 or deliver the oxygen enriched air at lower oxygen enrichment levels full time to the engine along with the normally aspirated intake air. With lower oxygen enrichment levels, the $O_2$ enriched air can be continuously fed without damaging the engine.

The method and apparatus for use in Embodiment 2 is shown in FIGS. 2, 3A, 3B, 3C and 3D. In this embodiment the VPSA process is practiced with a novel and unique apparatus. Under this embodiment, as in the embodiment of FIG. 1, a molecular sieve A is used to absorb nitrogen from the incoming air. However, the absorption process is performed at a much higher pressure (up to 150 psi or more) than can be supplied by the blower, supercharger, or turbocharger 56 used in Embodiment 1. The desorption process is also enhanced as a vacuum is used rather than a simple vent to atmosphere. This enhanced process (high pressure absorption and vacuum desorption) speeds up the process and insures faster absorption and desorption of the nitrogen and any moisture that might absorb in the molecular sieve A.

Figure 2:
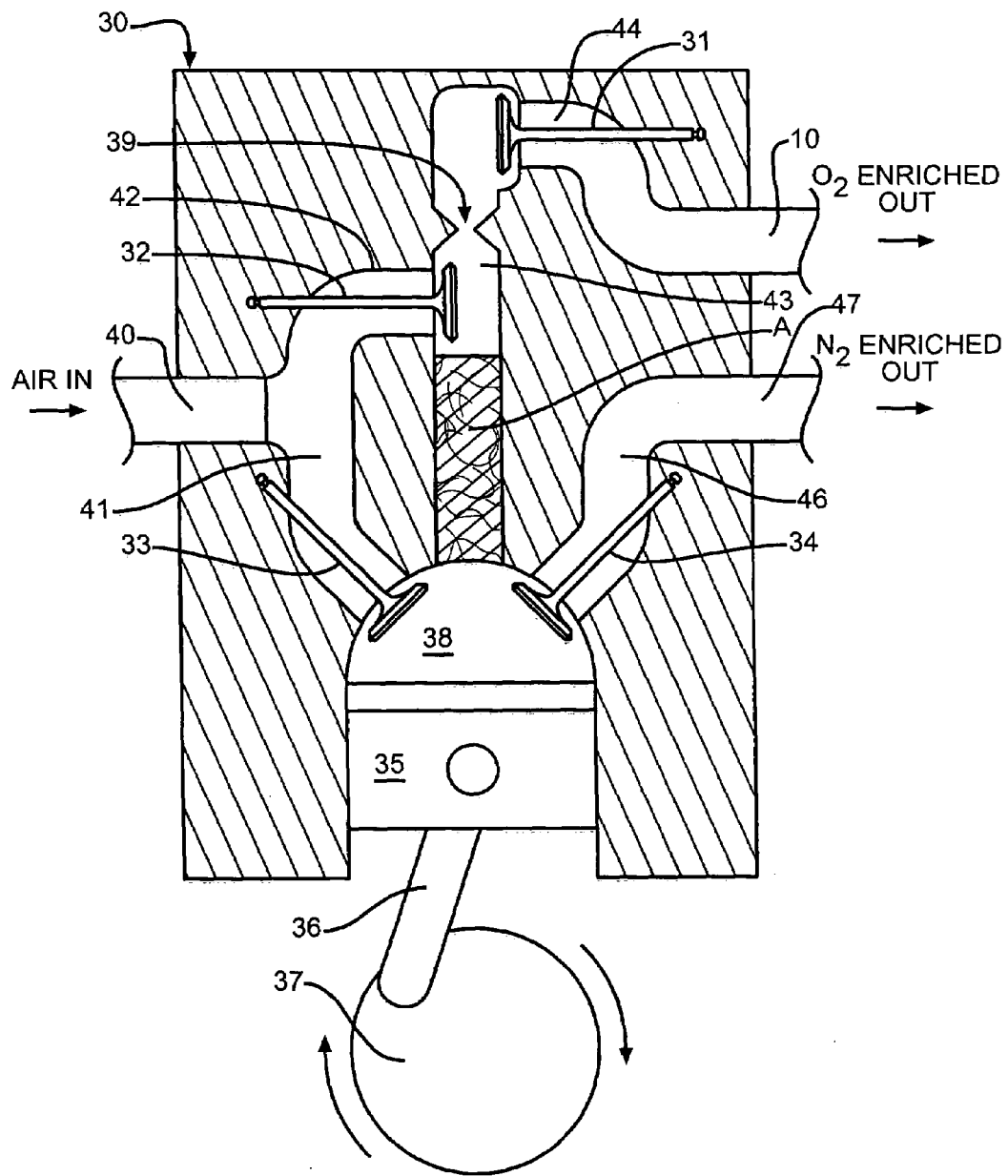
FIG. 2 is a schematic sectional view showing a modified embodiment 2 for directing oxygen enriched air through a storage tank into the intake manifold of an internal combustion engine or directly to the engine intake manifold without intermediate storage.

To practice this embodiment, a four cycle internal combustion engine can be used to provide the functions required to provide an oxygen enriched air. Referring to FIG. 2 there is shown schematically a section cut of an internal combustion engine 30 having an inlet passage 40 for receiving air from the atmosphere, a passageway 10 for supplying of oxygen enriched air to the intake manifold (not shown) of the internal combustion engine and a passageway 47 to supply the desorbed nitrogen enriched air to the exhaust manifold or to atmosphere.

The inlet passage 40 branches to join with (1) passageway 41 which leads to cylinder chamber 38 and (2) passageway 42 which extends to another passageway 43. Passageway 43 extends to the cylinder chamber 38. A molecular sieve A is positioned in the passageway 43 adjacent the cylinder chamber 38. A piston 35 powered by a crank shaft 37 and connecting rod 36 moves upwardly and downwardly in the cylinder chamber 38.

At a point beyond the juncture of passageway 42 and passageway 43, on the opposite side of such juncture from the molecular sieve A, the passageway 43 has a control orifice 39 of reduced size from the size of the passageway 43. Beyond the reduced size orifice 39, the passageway 43 intersects with yet another passageway 44 disposed at substantially right angles to the passageway 43. Passageway 44 communicates with passageway 10 leading to the intake manifold of the engine. A valve 31 is positioned at such juncture to open and close the passageway 44 to the flow of oxygen enriched air. Additionally, a valve 32 is positioned at the juncture of passageway 42 with the passageway 43 to open and close the flow of air therebetween. Another valve 33 is positioned at the juncture of passageway 41 and the cylinder chamber 38 to open and close that juncture to the flow of air. An additional passageway 46 extends between the chamber 38 and an outlet tube 47 for directing nitrogen enriched exhaust air to the exhaust manifold of the engine. An additional valve 34 is positioned to permit the flow of nitrogen enriched air from the chamber 38 through the passageway 46 when in an open position or to block such flow when in a closed position.

Figure 3A:
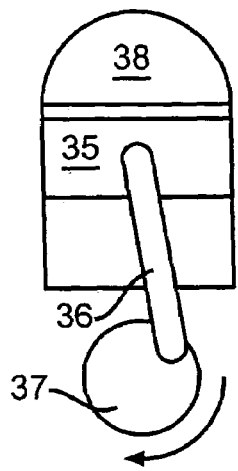
FIGS. 3A, 3B, 3C and 3D are a schematic view showing various positions of a piston and crank during various steps of a cycle of the apparatus of FIG. 2.
Figure 3B:
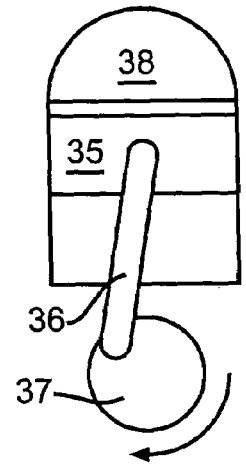
Figure 3C:
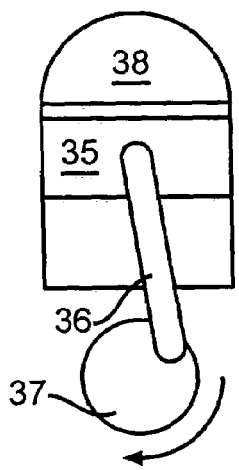
Figure 3D:
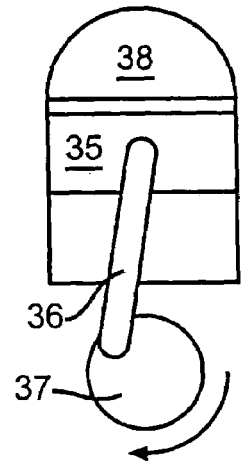

With reference to FIGS. 3A, 3B, 3C and 3D there is shown schematically the four cycles of a typical internal combustion engine. A piston 35 is stroked in a cylinder chamber 38 by a connecting rod 36 powered by the rotary motion of the crank shaft 37. FIG. 3A represents the intake cycle, FIG. 3B represents the compression cycle, FIG. 3C represents the power cycle and FIG. 3D represents the exhaust cycle.

The operation of this embodiment is as follows. Starting at the position of FIG. 3A, piston 35 will be stroked down by the rotary action of crank shaft 37 moving connecting rod 36 downward. During this portion of the cycle, valves 31, 32 and 34 (see FIG. 2) will be closed and valve 33 will be open, thereby providing a charge of air (intake) into the cylinder chamber 38. Further rotation of crank shaft 37 will close valve 33, open valve 31 and will force the piston 35 upwardly to compress the air thereby forcing it to flow through the molecular sieve A where a portion of the nitrogen in the air will be absorbed. With the valves 32 and 34 remaining closed, the air will be compressed by the piston 35 moving upwardly to reduce the size of the chamber 38 as shown in FIG. 3B. The amount of pressure which effects the absorption taking place will be controlled by the orifice 39 restricting the flow of oxygen enriched air through passageway 43 following exiting from the molecular sieve A. With the action of the piston 35 moving upwardly to reduce the size of the chamber 38, the pressure at which the air will be propelled through the molecular sieve A will be much higher than the pressure developed by the blowers 10 of the embodiment of FIG. 1. In the embodiment of FIG. 2, the pressure could reach 150 psi or more depending upon the size of the orifice 39.

The piston 35 will then cycle down (FIG. 3C) pulling air through passageway 42, open valve 32, into passageway 43 through the molecular sieve A and into the cylinder chamber 38. All other valves, namely valves 31, 33 and 34 will be closed at that time. The action of pulling air through the molecular sieve A when valves 31, 33 and 34 are closed, will create a partial vacuum which will cause desorption of the nitrogen from the molecular sieve A so that faster desorption will take place than would take place at atmospheric pressure. Thus, the downward movement of the piston 35 to the position shown in FIG. 3C will suck the air from passageway 43, through the molecular sieve A and into the chamber 38. Further rotation of crank shaft 37 to the position shown in FIG. 3D will cause the piston 35 to force the nitrogen rich air to exhaust through passageways 46 and 47 to the exhaust manifold upon opening valve 34. To achieve this result as piston 35 starts its up stroke, valve 34 opens, and valves 31, 32 and 33 will be moved to a closed position.

The above described VPSA apparatus will be connected and driven in such a way as to operate at an appropriate speed which will keep up with the needs of the internal combustion engine, or alternatively, storage to fill a storage tank.

As previously discussed, the prior art use of nitrous oxide provided oxygen enrichment of the air provided to the engine, from normally supplied air, with 20% oxygen levels to as high as 36%. This level of oxygen in the intake manifold could only be used for short periods without damaging the engine. The present invention can readily provide a 10% increase in oxygen level in the air from 20 to 22% or more. This increase would require a modest reduction of nitrogen in the air from 80% to about 78%. The nitrogen reduction needed to achieve the 10% oxygen increase would be about 2½%. This could be directly provided by the correctly sized device or indirectly supplied by the oxygen enriched air being stored and mixed with incoming air.

Embodiment 3

The previously described Embodiment 1, uses on-board manufacturing systems to produce high levels of oxygen enriched air and then storing it for later release to the internal combustion engine (with or without additional fuel) when demand for acceleration or pollution control is desired.

Embodiment 2 discloses a novel, very fast way to enrich the air with oxygen and then either storing it for later use as in Embodiment 1 or delivery of the oxygen enriched air at lower conversion rates continuously to the engine along with the normally aspirated air.

Embodiment 3 uses a small molecular sieve connected directly to the pressurized intake manifold. All air used by the engine is processed through the molecular sieve. When the embodiment is used, the conversion rate or stripping rate of nitrogen from the air stream is at a significantly lower rate than in either of the previously described embodiments. It is known that very high levels of oxygen in the combustion air would damage the engine when used full time. Using a very high rate of air flow over a small volume molecular sieve can result in low amounts of $N_2$ being stripped from the combustion air. As an example, reducing the $N_2$ from 80 to 76% (reduction of 5%) would enrich the $O_2$ in the air flow from 20 to 24 percent. A 20% increase in $O_2$ level in the combustion chamber along with additional fuel would give the engine a significant power surge. On race cars (NASCAR, INDY CAR), this system would result in high performance engines and cars. In the case where the total output of the supercharger or turbocharger would be directed through the molecular sieve systems, the engine could be optimized for power during the demand cycle of the race course. As an example in the INDY RACE, power is needed on the straight away and the molecular sieve could be flushed of $N_2$ on the curves.

Figure 4:
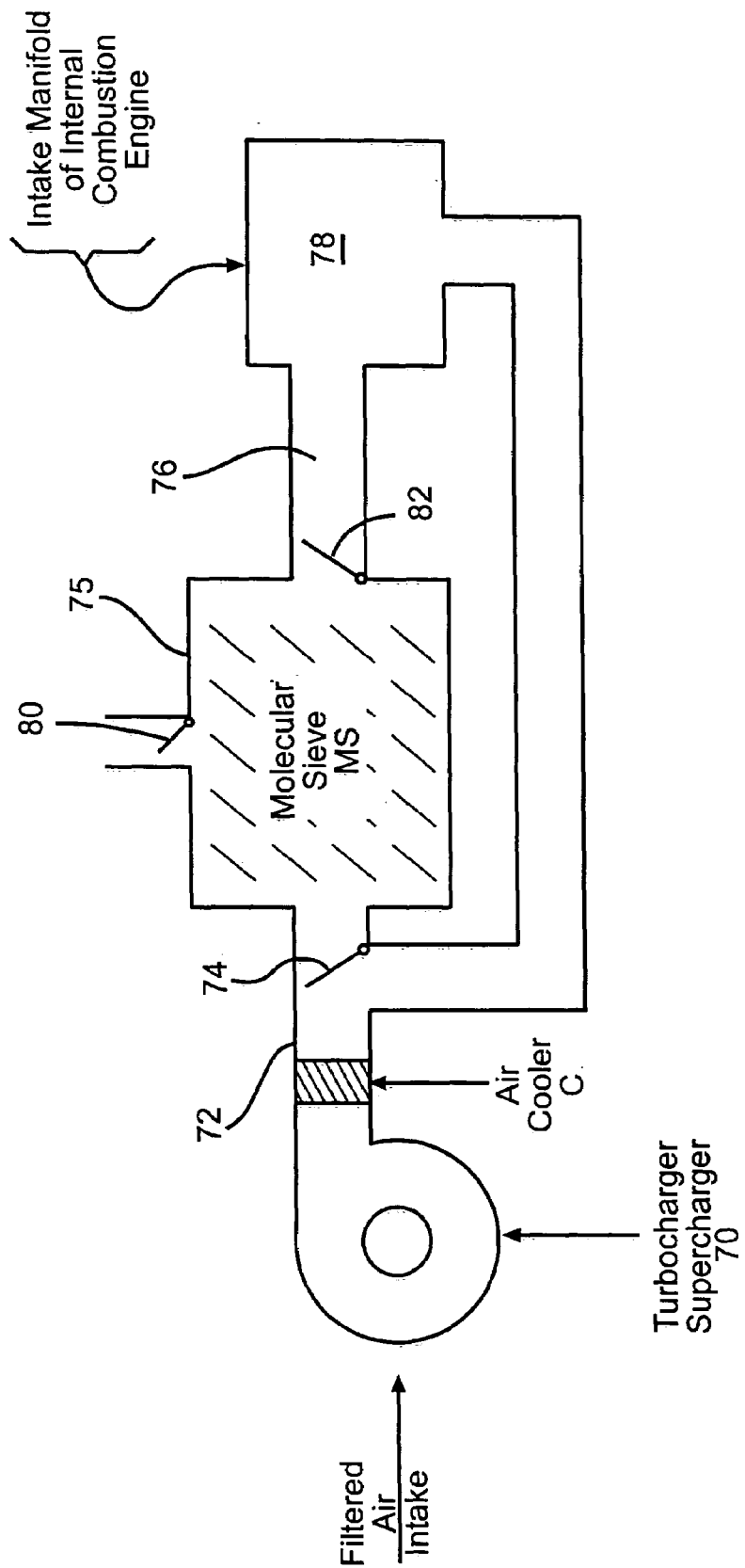
FIG. 4 is a view similar to FIG. 1 showing another alternate embodiment 3 for specific use or race cars with known race tack needs.

Referring to FIG. 4, Embodiment 3 is shown. In this embodiment the total combustion air for the engine is supplied from the turbocharger or supercharger 70 through inlet port 72. The air is pressurized and, after being cooled by cooler C as it flows through open valve 74, it flows through the molecular sieve 75 where some of the nitrogen is absorbed. The remaining oxygen enriched air flows throughs passageway 76 to the intake manifold 78 of the internal combustion engine. During the flow through the molecular sieve 75 valve 80 is closed. The above action takes place when the engine is in acceleration mode. When the deceleration mode is entered, the molecular sieve 75 is flushed of the nitrogen that was absorbed by dropping the pressure on the molecular sieve 75 allowing it to desorb and vent the nitrogen to atmosphere. This is done by closing valve 74 and 82 and opening valve 80. This action allows the intake manifold 78 to continue to be pressurized by the turbocharger or supercharger 70 but with normal air delivered through channel 84.

The above describes a way to arrange the $O_2$ enriched air to be used in a specific race course demand cycle.

Many modifications will be readily apparent to those skilled in the art.

The invention claimed is:

1. A method for providing oxygen enriched air to an internal combustion engine of an automobile comprising the steps of:
    (a) providing a molecular sieve for receiving and expelling air, said sieve having the property (i) of absorbing at least a portion of nitrogen from air moving therethrough under pressure such that air expelled therefrom has a higher concentration of oxygen than atmospheric air and (ii) upon being exposed to atmosphere at normal atmospheric pressure, desorbing at least a portion of said nitrogen;
    (b) delivering air to and through said molecular sieve under pressure higher than atmospheric pressure to form oxygen enriched air;
    (c) delivering fuel to said internal combustion engine;
    (d) delivering said oxygen enriched air and fuel in greater amounts than in step (c) to said internal combustion engine while said automobile is accelerating;
    (e) stopping step (b);
    (f) venting said molecular sieve to atmosphere; and
    (g) delivering normal air and fuel in lesser amounts to said internal combustion engine when said automobile is not accelerating.

2. The method according to claim 1 wherein during step (b) air is passed over a synthetic zeolite molecular sieve.

3. The method according to claim 1 further including the steps of
    (h) providing a second molecular sieve having the same properties as the molecular sieve of step (a);
    (i) delivering air to and through said second molecular sieve when the delivery of air to and through the molecular sieve of step (a) is stopped; and
    (j) delivering oxygen enriched air from said second molecular sieve to said internal combustion engine.

4. The method according to claim 1 further including the step of delivering said oxygen enriched air to a storage container prior to delivering it to said internal combustion engine.

5. The method according to claim 3 further including the step of delivering said oxygen enriched air to a storage container prior to delivering it to said internal combustion engine.

6. Apparatus for providing oxygen enriched air with fuel to an internal combustion engine comprising:
    (a) first and second molecular sieves for receiving and expelling air, said sieves having the property (i) of absorbing at least a portion of nitrogen from air moving therethrough under pressure such that air expelled therefrom has a higher concentration of oxygen than atmospheric air and (ii) upon being exposed to atmosphere at normal atmospheric pressure, desorbing at least a portion of said nitrogen;
    (b) means for sequentially delivering air under pressure to said first molecular sieve and to said second molecular sieve;
    (c) a first set of valves preventing the flow of air under pressure to said second molecular sieve when said air is flowing to said first molecular sieve and preventing the flow of air under pressure to said first molecular sieve when said air is flowing to said second molecular sieve;
    (d) a second set of valves operable to provide an open vent to atmosphere for said second molecular sieve when said first set of valves is preventing the flow thereto of air under pressure and to provide an open vent to atmosphere for said first molecular sieve when said first set of valves is preventing the flow thereto of air under pressure;
    (e) passageways between each of said first and second molecular sieves and said internal combustion engine;
    (f) a first sensor for detecting the amount of oxygen in air leaving said first molecular sieve; and
    (g) a second sensor for detecting the amount of oxygen in air leaving said second molecular sieve,
    said first sensor actuatable upon a reduction in oxygen in air leaving said first molecular sieve to stop the flow of air therethrough and said second sensor actuatable upon a reduction in oxygen in air leaving said second molecular sieve to stop the flow of air therethrough.

7. The apparatus according to claim 6 further including a chamber for storing oxygen enriched air, said storage chamber positioned to receive oxygen enriched air from at least one of said first and second molecular sieves and deliver it to said internal combustion engine.

8. A method for operating an internal combustion engine comprising the steps of
    (a) delivering combustible fuel to a combustion chamber of said engine;
    (b) delivering air including oxygen and nitrogen to said combustion compartment with said fuel;
    (c) when accelerating and prior to step (b), passing at least a portion of said air under pressure greater than atmospheric through a molecular sieve to reduce the concentration of nitrogen and provide oxygen enrichment to said air being delivered and increasing the amount of fuel being delivered over the amount being delivered in step (b);
    (d) when not accelerating diverting the air to bypass the molecular sieve and thereby allowing said molecular sieve to desorb nitrogen and reducing the amount of fuel being delivered; and
    (e) storing at least a portion of said oxygen enriched air prior to delivering it to said combustion chamber.

9. The method according to claim 8 wherein the concentration of oxygen in the delivered air exceeds 28% and oxygen enriched air is delivered intermittently.

10. A method for providing oxygen enriched air to an internal combustion engine comprising the steps of:
 (a) providing a cylinder chamber having a piston movable therein from a first position defining an enlarged chamber to a second position defining a smaller chamber;
 (b) providing (i) an inlet and inlet valve for intermittently introducing air to said chamber, (ii) an outlet and outlet valve for intermittently expelling air from said chamber and (iii) a passageway having positioned therein a molecular sieve, said passageway communicating with said chamber and an intake manifold of said engine;
 (c) opening said inlet valve while said piston is moving in a direction enlarging said chamber; and
 (d) moving said piston in a direction making said chamber smaller while both said inlet valve and said outlet valve are closed to force air under pressure through said passageway and said molecular sieve to said intake manifold.

11. A method according to claim 10 further including the step of restricting the size of said passageway on the opposite side of said molecular sieve from said chamber to cause a build up of pressure in air flow from said chamber and through said molecular sieve.

12. A method according to claim 10 further including the steps of moving said piston in a direction enlarging said chamber while said inlet valve and said outlet valve are closed to draw air through said passageway and said molecular sieve to provide nitrogen enriched air to said chamber and opening said outlet valve to vent said nitrogen enriched air upon movement of said piston to reduce the size of said chamber.

13. In an internal combustion engine having an intake manifold the improvement comprising:
 (a) a cylinder chamber having a piston movable therein from a first position defining an enlarged chamber to a second position defining a smaller chamber;
 (b) an inlet and an inlet valve for opening and closing communication between said inlet and said chamber;
 (c) an outlet and an outlet valve for opening and closing communication between said chamber and said outlet;
 (d) a passageway communicating with said chamber and said intake manifold; and,
 (e) a molecular sieve in said passageway.

14. The improvement of claim 13 wherein said inlet valve and said outlet valve are operable to be closed during that portion of the cycle of movement of said piston when said piston is moving toward said second position to force air under pressure through said molecular sieve and into said intake manifold.

15. The improvement of claim 13 further including a restriction in the size of said passageway between said molecular sieve and said intake manifold.

16. The improvement of claim 13 further including a second air inlet and a second inlet valve positioned on the opposite side of said molecular sieve from said chamber, said inlet valve and said outlet valve operable to be closed and said second inlet valve operable to be open during a portion of the movement of said piston toward said first position.

17. The improvement of claim 16 further including an additional valve in said passageway between said molecular sieve and said intake manifold.

18. The improvement of claim 17 further including a storage container located between said molecular sieve and said intake manifold to store the oxygen enriched air.

* * * * *